US011881367B2

(12) United States Patent
Hilker

(10) Patent No.: US 11,881,367 B2
(45) Date of Patent: Jan. 23, 2024

(54) SWITCH DEVICE, HIGH-VOLTAGE CIRCUIT BREAKER, AND METHOD FOR OPERATING THE SWITCH DEVICE

(71) Applicant: Siemens Energy Global GmbH & Co. KG, Munich (DE)

(72) Inventor: Thomas Hilker, Stahnsdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 148 days.

(21) Appl. No.: 17/599,015

(22) PCT Filed: Feb. 28, 2020

(86) PCT No.: PCT/EP2020/055230
§ 371 (c)(1),
(2) Date: Sep. 28, 2021

(87) PCT Pub. No.: WO2020/193060
PCT Pub. Date: Oct. 1, 2020

(65) Prior Publication Data

US 2022/0044892 A1 Feb. 10, 2022

(30) Foreign Application Priority Data

Mar. 28, 2019 (DE) ..................... 10 2019 204 303.8

(51) Int. Cl.
*H01H 33/36* (2006.01)
*H01H 9/54* (2006.01)
(Continued)

(52) U.S. Cl.
CPC .............. *H01H 33/36* (2013.01); *H01H 9/54* (2013.01); *H01H 33/14* (2013.01); *H01H 33/59* (2013.01)

(58) Field of Classification Search
CPC ........ H01H 33/36; H01H 33/14; H01H 33/59; H01H 9/54; H01H 33/42; H01H 9/161; H02B 13/035
(Continued)

(56) References Cited

U.S. PATENT DOCUMENTS 7,800,872 B2 * 9/2010 Arioka .................... H01H 9/54 361/28
9,329,242 B2 * 5/2016 Schmidt .................... H02P 3/22
(Continued)

FOREIGN PATENT DOCUMENTS

CN 207 557 431 U 6/2018
DE 1 267 308 A 5/1968
(Continued)

*Primary Examiner* — William A Bolton
(74) *Attorney, Agent, or Firm* — Laurence A. Greenberg; Werner H. Stemer; Ralph E. Locher

(57) ABSTRACT

A switching device for a high-voltage circuit breaker includes at least two switches for ascertaining states of apparatuses of the switching device via a monitoring system. The at least two switches are connected together in series and/or in parallel and can be connected together to exactly one input of the monitoring system. A high-voltage circuit breaker includes the switching device and the monitoring system, which is and/or includes a data acquisition, data processing, data storage and/or data transmission unit, in particular with digital-analog and/or analog-digital converters. A method for operating the switching device provides the at least two switches connected in series and/or in parallel, and forwards the state of the apparatuses via an input, in particular via exactly one input of the monitoring system, in the form of electric variables, in particular a voltage.

25 Claims, 7 Drawing Sheets

(51) Int. Cl.
*H01H 33/14* (2006.01)
*H01H 33/59* (2006.01)

(58) Field of Classification Search
USPC .............................. 218/2, 4–6, 8–9; 200/416
See application file for complete search history.

(56) References Cited

U.S. PATENT DOCUMENTS

| | | | | |
|---|---|---|---|---|
| 9,581,123 | B2 * | 2/2017 | Betscher | F02N 11/087 |
| 9,912,156 | B2 * | 3/2018 | Couture | H01H 33/66 |
| 2009/0273419 | A1 * | 11/2009 | Mitlmeier | H01H 89/06 361/62 |
| 2012/0187089 | A1 | 7/2012 | Chen et al. | |
| 2014/0332500 | A1 * | 11/2014 | Pessina | H01H 9/542 218/4 |

FOREIGN PATENT DOCUMENTS

| | | | |
|---|---|---|---|
| DE | 1565340 | A1 | 8/1970 |
| DE | 102010011198 | A1 | 9/2011 |
| EP | 0 001 059 | A1 | 3/1979 |
| EP | 2 466 604 | A1 | 6/2012 |

* cited by examiner

SWITCH DEVICE, HIGH-VOLTAGE CIRCUIT BREAKER, AND METHOD FOR OPERATING THE SWITCH DEVICE

FIELD AND BACKGROUND OF THE INVENTION

The invention relates to a switching device for a high-voltage circuit breaker, to the high-voltage circuit breaker, and to a method for operating the switching device, wherein the switching device comprises at least two switches for ascertaining states of apparatuses of the switching device via a monitoring system.

High-voltage circuit breakers generally switch in three phases, that is to say three current paths through three poles are closed or opened simultaneously in a switching operation by three breaker units acting in parallel, in each case one breaker unit per pole. In this case, voltages of up to 1200 kV and/or currents of up to several hundred amperes may be switched per phase. In order to be able to simultaneously switch the three phases, there are two structures of high-voltage circuit breakers. In a first structure, a common drive, in particular a spring mechanism drive, is mechanically connected to the three breaker units. A high-voltage circuit breaker for switching three phases having a drive is known for example from DE 10 2010 011 198 A1.

In a second structure, each breaker unit is moved by its own drive, in particular in each case by a spring mechanism drive. Each of these spring mechanism drives and/or breaker units has a motor end switch and/or an auxiliary switch that replicates the state of the mechanical spring mechanism and/or the corresponding breaker unit and thus indicates readiness for the on switching operation and/or provides information as to whether the respective breaker unit is closed or open.

If the on switching readiness is intended to be monitored by a monitoring system, the three motor end switches have to be queried. To this end, each of the motor end switches is electrically connected to an in particular digital input of the monitoring system. The logic combination is performed in the monitoring system.

In order to acquire the status of the breaker units of the high-voltage circuit breaker via a monitoring system, three inputs of the monitoring system have to be electrically connected in each case to an auxiliary switch contact or switch. The information from the inputs is evaluated or combined in the monitoring system. In both cases, that of acquiring the on switching readiness of the spring mechanisms or acquiring the status of the breaker units, at least three electrical inputs of the monitoring system are thus required. Acquiring the on switching readiness of the spring mechanisms and acquiring the status of the breaker units independently of one another even require six electrical inputs of the monitoring system. Monitoring systems used at present often however only have five inputs for cost reasons, such as for example Sensboxes as data acquisition and/or data processing and/or data storage and/or data transmission unit.

Monitoring the state of a high-voltage circuit breaker additionally comprises sensors, such as for example for measuring temperatures, humidity, pressure, shaking, current/voltage states, and/or resistances, for example for measuring soiling on an insulator surface. The sensors are likewise electrically connected to the monitoring system and generally each require a separate input. Using more than one monitoring system, for example in the form of two or more Sensboxes, increases the costs and the footprint as well as expenditure. Developing and using monitoring systems having additional inputs likewise increases costs and expenditure, and reduces savings from for example scaling effects linked to manufactured numbers of parts of the respective monitoring systems.

SUMMARY OF THE INVENTION

The object of the present invention is to specify a switching device for a high-voltage circuit breaker, a high-voltage circuit breaker having the switching device, and a method for operating the switching device, which solve the problems described above. The object is in particular to easily and inexpensively monitor the state of a high-voltage circuit breaker, in particular using just one input of a monitoring system for multiple poles.

The stated object is achieved according to the invention by a switching device for a high-voltage circuit breaker having the features described below, a high-voltage circuit breaker having a switching device, in particular having a switching device described above, having the features described below, and/or by a method for operating a switching device for a high-voltage circuit breaker, in particular a switching device described below. Advantageous embodiments of the switching device according to the invention for a high-voltage circuit breaker, and/or of the high-voltage circuit breaker according to the invention having a switching device, in particular having a switching device described above, and/or of the method according to the invention for operating a switching device for a high-voltage circuit breaker, in particular a switching device described above, are specified in the dependent claims. In this case, subjects of the main claims may be combined with one another and with features of dependent claims, and features of the dependent claims may be combined with one another.

A switching device according to the invention for a high-voltage circuit breaker comprises at least two switches for ascertaining states of apparatuses of the switching device via a monitoring system. The at least two switches are connected to one another in a series circuit and/or in a parallel circuit and are able to be connected together to exactly one input of the monitoring system.

This results in a kind of signal processing of the at least two switches already via the switching device, and only one input of the inputs of the monitoring system is required. The other inputs may be used for example for sensors, in particular for measuring temperatures, humidity, pressure, shaking, current/voltage states, and/or resistances and other state variables of the high-voltage circuit breaker. This saves on expenditure and costs and allows optimum use of the monitoring system, in particular for multiple poles.

The at least two switches may each be auxiliary switches that replicate the state of a respective apparatus, in particular of a respective breaker unit. It thus becomes possible to monitor multiple apparatuses of the high-voltage circuit breaker, in particular breaker units of various poles, via only one input of the monitoring system, for example a Sensbox, with the advantages described above.

The at least two switches may each be able to be actuated by mechanical connection elements, in particular elements of a kinematic chain, of the respective apparatus, in particular of the respective breaker unit. One breaker unit is thus able to be monitored by one switch and a second breaker unit is able to be monitored simultaneously by a second switch, etc., while using only one input of the monitoring system.

The at least two switches may each be motor end position switches that replicate the state of a respective spring mechanism for a drive of a breaker unit. In the case of fully tensioned spring mechanisms, in particular of all of the spring mechanisms, a signal may be present at the input of the monitoring system that unambiguously identifies the state. The high-voltage circuit breaker is thus fully ready for use and may be switched for all of the poles, in particular with an off-on-off switching sequence.

A motor for tensioning a spring mechanism via a tensioning wheel may be assigned to each of the at least two switches, wherein the respective switch may be able to be tripped via cams on the tensioning wheel, in particular one cam, and/or recesses in the tensioning wheel, in particular one recess arranged in the circumference of the tensioning wheel. When the tensioning wheel is rotated, the cam triggers actuation of the switch, and in particular leads to a switched-on switch in the region of the cam. When a tensioning wheel with a recess is rotated, the recess triggers actuation of the switch, and the recess in particular leads to a switched-off switch. This gives unambiguous information about the state of the spring mechanism, that is to say fully tensioned or not fully tensioned, and thus about the high-voltage circuit breaker or its drives and/or breaker units, using simple, inexpensive and reliable means.

The switching device may comprise exactly three switches, in particular one switch per pole of the high-voltage circuit breaker, wherein a breaker unit and/or a spring mechanism and/or a motor for tensioning a spring mechanism is assigned to each switch in each case. The state, in particular the readiness state of all three poles for switching, is thus able to be detected easily and inexpensively using one input of the monitoring system for a high-voltage circuit breaker for switching three poles.

At least one relay and/or contactor may be designed to change between the series and parallel circuit of the at least two switches, in particular by switching opener and/or closing contacts. A series circuit of the at least two switches corresponds to an AND combination, as a result of which for example the state of at least one opened breaker unit is able to be detected and/or the state of at least one not fully tensioned spring mechanism, which corresponds to a switch not fully ready for use. A parallel circuit of the at least two switches corresponds to an OR combination, as a result of which for example the state of a completely open, that is to say with all breaker units open, high-voltage circuit breaker is able to be detected and/or the state of all completely tensioned spring mechanisms, which corresponds to a switch fully ready for use. A change between the series and parallel circuit of the at least two switches makes it possible to detect and thus distinguish between the states of at least one and all open breaker units and/or at least one not fully tensioned spring mechanism and all spring mechanisms fully tensioned. A multiplicity of states of the high-voltage circuit breaker is thus able to be identified or detected unambiguously, easily and inexpensively using just one input of the monitoring system with the aid of the switching device according to the invention.

The high-voltage circuit breaker according to the invention may comprise a switching device, in particular a switching device described above, having a monitoring system, which may be and/or may comprise a data acquisition and/or data processing and/or data storage and/or data transmission unit, in particular having digital-to-analog and/or analog-to-digital converters. It is thereby for example possible to perform simple and inexpensive remote maintenance and/or control of the high-voltage circuit breaker via the monitoring system, and/or states are easily and inexpensively able to be stored, in particular with little memory requirement per state change, and/or read out during maintenance, in particular remotely for example via a hand-held unit, for example a mobile telephone, laptop or tablet.

The monitoring system may comprise more than one electrical and/or optical input, in particular five inputs, and the series circuit and/or the parallel circuit of the at least two switches, in particular three switches, may be connected to one of the inputs. This makes it possible to detect or monitor the state of the high-voltage circuit breaker using only one monitoring system, in particular using only one Sensbox, and there are remaining free inputs, in particular four free inputs, to which further sensors may be connected, as described above.

Sensors, in particular sensors for monitoring the state of the high-voltage circuit breaker, in particular sensors for measuring temperature, humidity, pressure, current/voltage, resistance and/or radiation, may be included and are connected to inputs of the monitoring system. Provision may thus be made for five inputs, in particular three analog inputs and two digital inputs, wherein the switching device according to the invention may for example be connected to a digital input, and the sensors may be connected to the analog inputs and the one further digital input. It is thus possible to process, record and/or transmit a series of measured variables and states with minimum effort, in particular using just one Sensbox.

A method according to the invention for operating a switching device for a high-voltage circuit breaker, in particular a switching device described above, comprises the fact that at least two switches replicate states of apparatuses of the switching device and, in a series circuit and/or in a parallel circuit, forward the state via an input, in particular via exactly one input of a monitoring system, in the form of electrical variables, in particular voltage.

The at least two switches may be combined as an OR combination through a parallel circuit and/or the at least two switches may be combined as an AND combination through a series circuit.

The at least two switches, as end position switches, may each replicate the state of a spring mechanism as drive for a breaker unit. In the case of a parallel circuit of the at least two switches as OR combination, a voltage may be present at the input of the monitoring system until all of the spring mechanisms are tensioned. In the case of a series circuit of the at least two switches as AND combination, a voltage may be present at the input of the monitoring system until at least one spring mechanism is tensioned. The interconnection of the at least two switches may be changed between a series and parallel circuit in particular via a relay, in particular depending on the tripping of the high-voltage circuit breaker.

The advantages of the method according to the invention for operating a switching device for a high-voltage circuit breaker, in particular a switching device described above, as claimed in patent claim 11, and/or of the high-voltage circuit breaker having a switching device, in particular having a switching device described above, as claimed in patent claim 8, are analogous to the advantages described above of the switching device according to the invention for a high-voltage circuit breaker as claimed in patent claim 1, and vice versa.

Exemplary embodiments of the invention are illustrated schematically below in FIGS. 1 to 7 and described in more detail hereinafter.

DETAILED DESCRIPTION OF THE INVENTION

Figure 1:
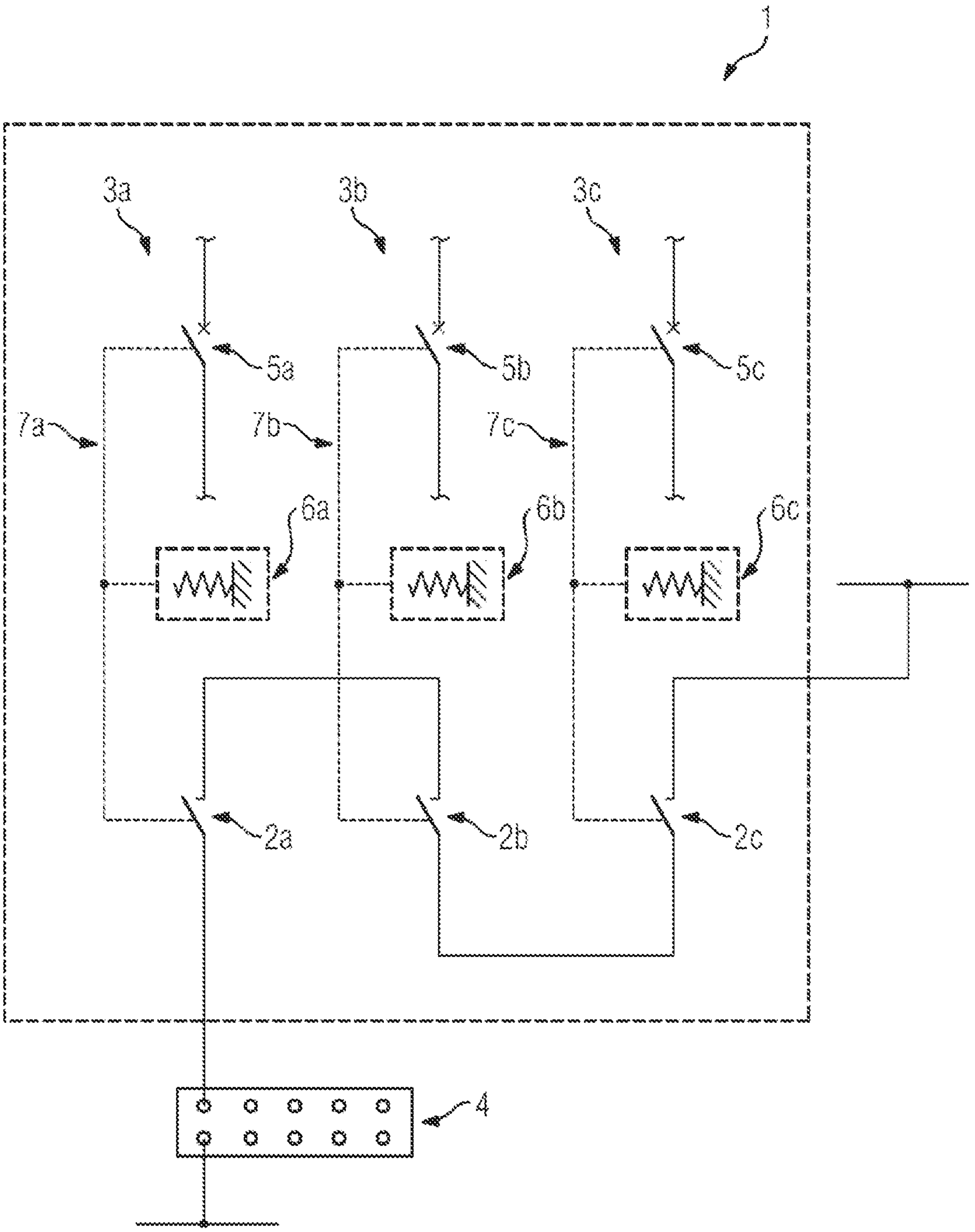
FIG. 1 schematically shows a switching device 1 according to the invention for a high-voltage circuit breaker, having three switches 2a, 2b, 2c in series, for ascertaining states of apparatuses 3a, 3b, 3c of the switching device 1 via a monitoring system 4, and FIG. 2 schematically shows a switching device 1 according to the invention having three switches 2a, 2b, 2c in series, for ascertaining states of spring mechanisms 6a, 6b, 6c via motor end switching contacts, able to be actuated via tensioning wheels 9a, 9b, 9c with cams 10a, 10b, 10c, and FIG. 3 schematically shows a switching device 1 according to the invention having three switches 2a, 2b, 2c in series, analogous to the switching device of FIG. 2, wherein the tensioning wheels 9a, 9b, 9c have recesses 11a, 11b, 11c instead of cams 10a, 10b, 10c, and FIG. 4 schematically shows a switching device 1 according to the invention for a high-voltage circuit breaker, analogous to the switching device 1 of FIG. 1, but with three switches 2a, 2b, 2c in a parallel circuit, and FIG. 5 schematically shows a switching device 1 according to the invention, analogous to the switching device 1 of FIG. 2, but with three switches 2a, 2b, 2c in a parallel circuit, and FIG. 6 schematically shows a switching device 1 according to the invention, analogous to the switching device 1 of FIG. 3, but with three switches 2a, 2b, 2c in a parallel circuit, and FIG. 7 schematically shows a switching device 1 according to the invention for a high-voltage circuit breaker, having three switches 2a, 2b, 2c, in which a change takes place between the series and parallel circuit through opener contacts 13, 14.

FIG. 1 schematically illustrates a switching device 1 according to the invention for a high-voltage circuit breaker, having three switches 2a, 2b, 2c in series, for ascertaining states of apparatuses 3a, 3b, 3c of the switching device 1 via a monitoring system 4. The series circuit is connected to a single input of the monitoring system 4, which is for example a Sensbox with 5 inputs, designed for example as a data acquisition, data processing, data storage and/or data transmission unit. The three switches 2a, 2b, 2c are each for example connected to an associated spring mechanism 6a, 6b, 6c and/or breaker unit 5a, 5b, 5c as apparatuses 3a, 3b, 3c, the states of which need to be ascertained via the switching device 1. A connection is made in particular mechanically via mechanical connection elements 7a, 7b, 7c, which are or comprise for example elements of a kinematic chain of the high-voltage circuit breaker, and are designed to actuate the associated switches 2a, 2b, 2c upon state changes of the respective spring mechanism 6a, 6b, 6c and/or breaker unit 5a, 5b, 5c as apparatuses 3a, 3b, 3c.

The three switches 2a, 2b, 2c, for example in the form of auxiliary switch contacts, are electrically interconnected such that the status of the three spring mechanisms 6a, 6b, 6c and/or breaker units 5a, 5b, 5c of the high-voltage circuit breaker is able to be combined and is able to be acquired by an, in particular exactly one, for example digital input of the monitoring system 4.

In FIG. 1, the three switches 2a, 2b, 2c are connected in series and electrically connected to an input of the monitoring system 4. If the breaker units 5a, 5b, 5c are closed by the mechanical drives, designed for example in the form of spring mechanisms 6a, 6b, 6c, then the switches 2a, 2b, 2c are closed by the mechanical connection elements 7a, 7b, 7c. An electric voltage is present at the input of the monitoring system 4 and represents the closed state of all of the breaker units 5a, 5b, 5c, and thus of the high-voltage circuit breaker. If at least one breaker unit 5a, 5b, 5c is opened, then the corresponding switch 2a, 2b, 2c is also opened. By virtue of the series circuit and the associated AND combination of the switches 2a, 2b, 2c, there is no voltage at the input of the monitoring system 4. The state of at least one open breaker unit 5a, 5b, 5c is thus indicated.

Figure 2:
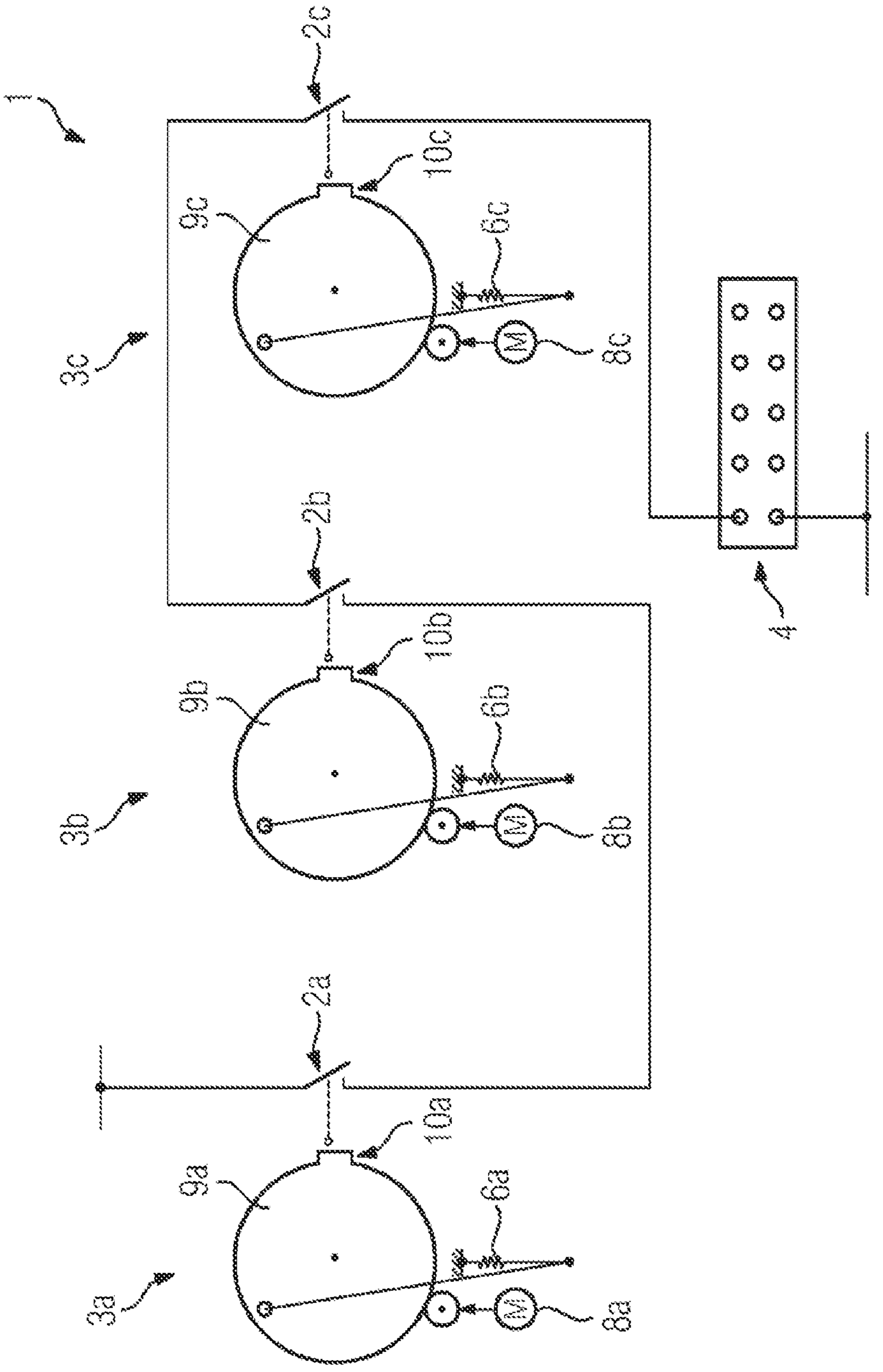

FIG. 2 schematically illustrates a switching device 1 according to the invention for a high-voltage circuit breaker, having three switches 2a, 2b, 2c in series, for ascertaining states of the spring mechanisms 6a, 6b, 6c and/or states of motors 8a, 8b, 8c for tensioning the spring mechanisms 6a, 6b, 6c, via a monitoring system 4. The series circuit, analogously to FIG. 1, is connected to a single input of the monitoring system 4, wherein the monitoring system 4 is for example a Sensbox with 5 inputs, designed for example as a data acquisition, data processing, data storage and/or data transmission unit.

Figure 3:
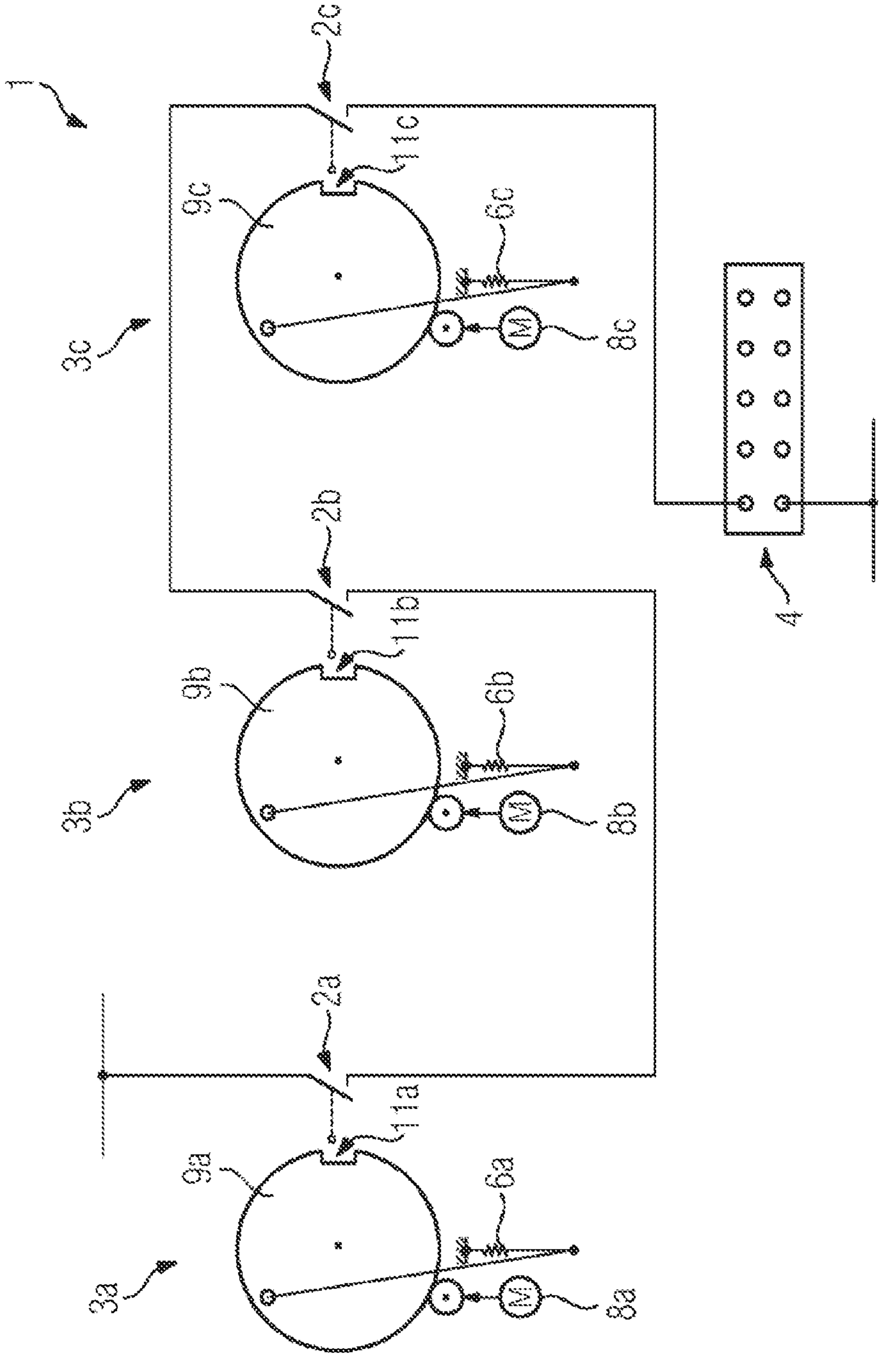

The three switches 2a, 2b, 2c are for example designed as motor end switch contacts or included therein. The motors 8a, 8b, 8c are designed to tension the spring mechanisms 6a, 6b, 6c via mechanical elements, in particular transmission parts and/or elements of a kinematic chain that comprise tensioning wheels 9a, 9b, 9c. In this case, in FIG. 2, the tensioning wheels 9a, 9b, 9c have cams 10a, 10b, 10c, for example in the form of bulges on the circumference of the respective tensioning wheel 9a, 9b, 9c, which actuate the respective switches 2a, 2b, 2c, in particular upon reaching the end position of the respective motor 8a, 8b, 8c when the associated spring mechanism 6a, 6b, 6c is fully tensioned. In FIG. 3, the tensioning wheels 9a, 9b, 9c, rather than cams 10a, 10b, 10c, have recesses 11a, 11b, 11c, for example in the form of cutouts on the circumference of the respective tensioning wheel 9a, 9b, 9c, which actuate the respective switches 2a, 2b, 2c, in particular upon reaching the end position of the respective motor 8a, 8b, 8c when the associated spring mechanism 6a, 6b, 6c is fully tensioned.

The three switches 2a, 2b, 2c, in particular designed as motor end switch contacts, are electrically interconnected such that the status of the three spring mechanisms 6a, 6b, 6c of the high-voltage circuit breaker is combined and is able to be acquired by an, in particular exactly one, for example digital input of the monitoring system 4.

In the exemplary embodiment of FIG. 2, the position of the respective spring mechanism 6a, 6b, 6c is indicated by a cam 10a, 10b, 10c on the associated tensioning wheel 9a, 9b, 9c.

The switches 2a, 2b, 2c, for example in the form of motor end switch contacts, are designed as opener contacts that are connected in series. In this configuration, a voltage is present at the monitoring system 4 or at the input of the monitoring system 4 only until one of the three spring mechanisms 6a, 6b, 6c is tensioned, and the current path is thus opened.

In the exemplary embodiment of FIG. 3, the status of each individual spring mechanism 6a, 6b, 6c is monitored by the switches 2a, 2b, 2c. In the exemplary embodiment, the information about only one fully tensioned pole of the high-voltage circuit breaker is put through when only one of the three spring mechanisms 6a, 6b, 6c is fully tensioned. The switches 2a, 2b, 2c are embodied as a closer contact and connected in series and thus constitute an AND combination. The series circuit is electrically connected to the input of the monitoring system 4. When a spring mechanism 6a, 6b, 6c is not fully tensioned, the corresponding switch 2a, 2b, 2c is actuated by the circumference of the tensioning wheel 9a, 9b, 9c and the current path through the corresponding switch 2*a*, 2*b*, 2*c* is closed. A voltage is present at the input of the monitoring system 4 until the current path is interrupted. The current path is opened when one of the spring mechanisms 6*a*, 6*b*, 6*c* is tensioned, the switch 2*a*, 2*b*, 2*c* or end position switch drops into the respective recess 11*a*, 11*b*, 11*c* in the tensioning wheel 9*a*, 9*b*, 9*c*, and the actuation of the switch 2*a*, 2*b*, 2*c* is thus canceled. If the current path of only one switch 2*a*, 2*b*, 2*c* is interrupted, then the AND combination is interrupted and no voltage is present at the input of the monitoring system 4.

Figure 4:
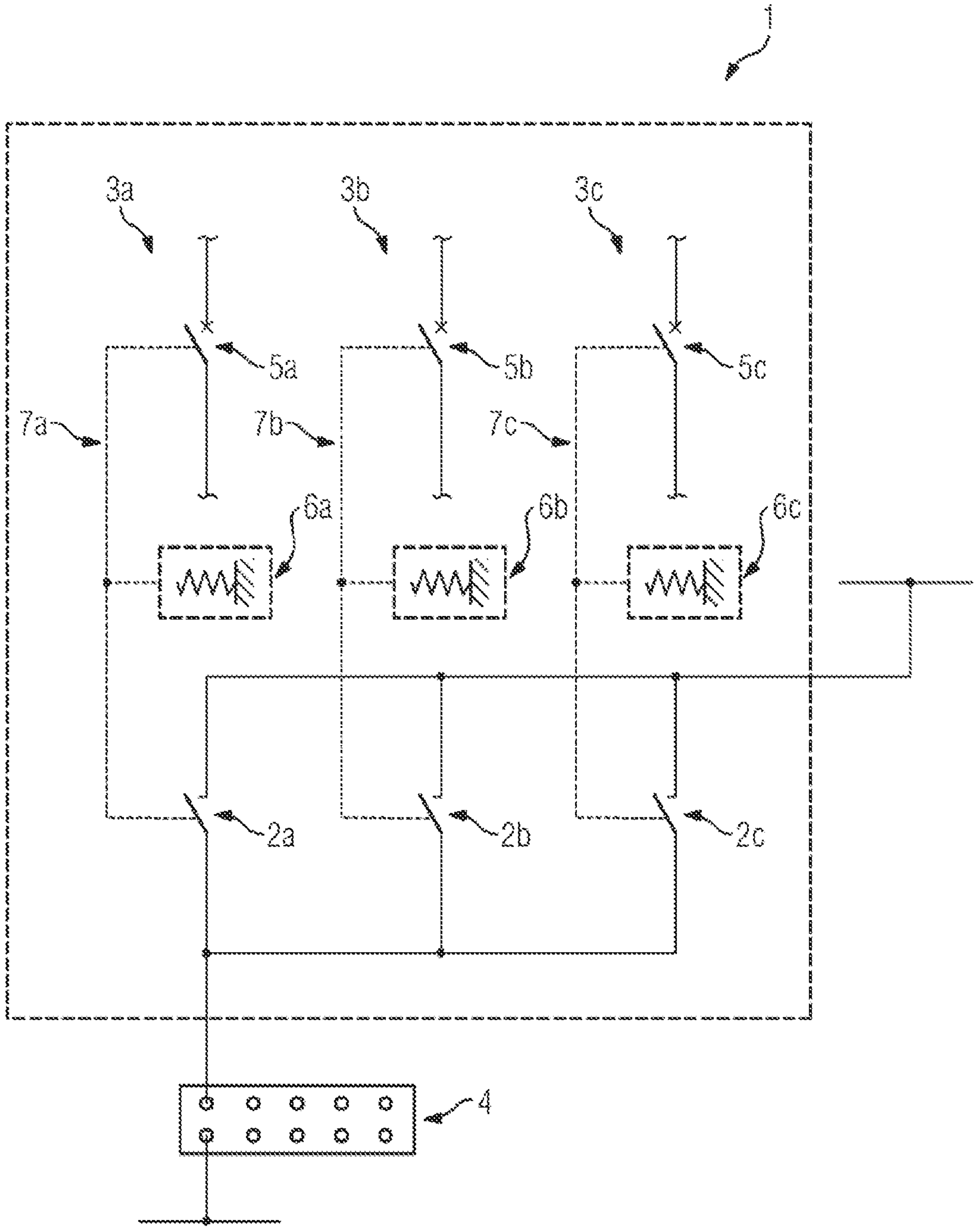

FIG. 4 schematically illustrates a switching device 1 according to the invention for a high-voltage circuit breaker, having three switches 2*a*, 2*b*, 2*c* in a parallel circuit, for ascertaining states of apparatuses 3*a*, 3*b*, 3*c* of the switching device 1 via the monitoring system 4. The parallel circuit is connected to a single input of the monitoring system 4, wherein the monitoring system 4 is for example a Sensbox with 5 inputs, designed for example as a data acquisition, data processing, data storage and/or data transmission unit. The three switches 2*a*, 2*b*, 2*c* are for example each connected to an associated spring mechanism 6*a*, 6*b*, 6*c* and/or breaker unit 5*a*, 5*b*, 5*c* as apparatuses 3*a*, 3*b*, 3*c*, the states of which need to be ascertained via the switching device 1. A connection is made in particular mechanically via mechanical connection elements 7*a*, 7*b*, 7*c*, which are or comprise for example elements of a kinematic chain of the high-voltage circuit breaker, and are designed to actuate the associated switches 2*a*, 2*b*, 2*c* upon state changes of the respective spring mechanism 6*a*, 6*b*, 6*c* and/or breaker unit 5*a*, 5*b*, 5*c* as apparatuses 3*a*, 3*b*, 3*c*.

The three switches 2*a*, 2*b*, 2*c*, for example in the form of auxiliary switch contacts, are electrically interconnected such that the status of the three spring mechanisms 6*a*, 6*b*, 6*c* and/or breaker units 5*a*, 5*b*, 5*c* of the high-voltage circuit breaker is able to be combined and able to be acquired by an, in particular exactly one, for example digital input of the monitoring system 4.

In FIG. 4, the three switches 2*a*, 2*b*, 2*c* are connected in a parallel circuit and electrically connected to an input of the monitoring system 4. If the breaker units 5*a*, 5*b*, 5*c* are closed by the mechanical drives, for example designed in the form of spring mechanisms 6*a*, 6*b*, 6*c*, then the switches 2*a*, 2*b*, 2*c* are closed by the mechanical connection elements 7*a*, 7*b*, 7*c*. An electric voltage is present at the input of the monitoring system 4 and represents the closed state of at least one of the three breaker units 5*a*, 5*b*, 5*c*. If all of the breaker units 5*a*, 5*b*, 5*c* are opened, then all of the switches 2*a*, 2*b*, 2*c* are also opened. By virtue of the parallel circuit and the associated OR combination of the switches 2*a*, 2*b*, 2*c*, only now is no voltage present at the input of the monitoring system 4. The state of a completely open high-voltage circuit breaker is thus indicated.

Figure 5:
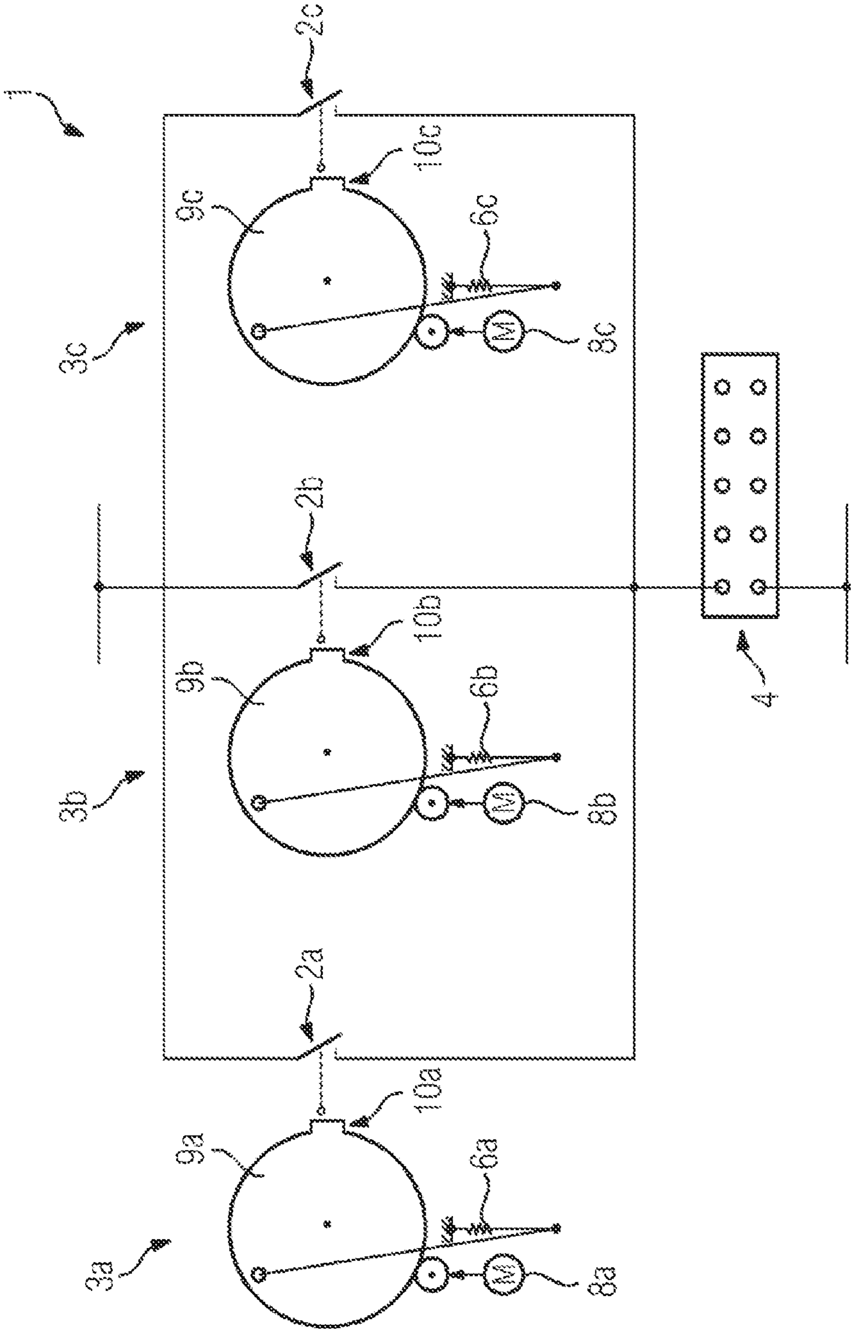

FIG. 5 schematically illustrates a switching device 1 according to the invention for a high-voltage circuit breaker, having three switches 2*a*, 2*b*, 2*c* in a parallel circuit, for ascertaining states of the spring mechanisms 6*a*, 6*b*, 6*c* and/or states of motors 8*a*, 8*b*, 8*c* for tensioning the spring mechanisms 6*a*, 6*b*, 6*c*, via a monitoring system 4. The parallel circuit, analogously to FIG. 4, is connected to a single input of the monitoring system 4, which is for example a Sensbox with 5 inputs, designed for example as a data acquisition, data processing, data storage and/or data transmission unit.

Figure 6:
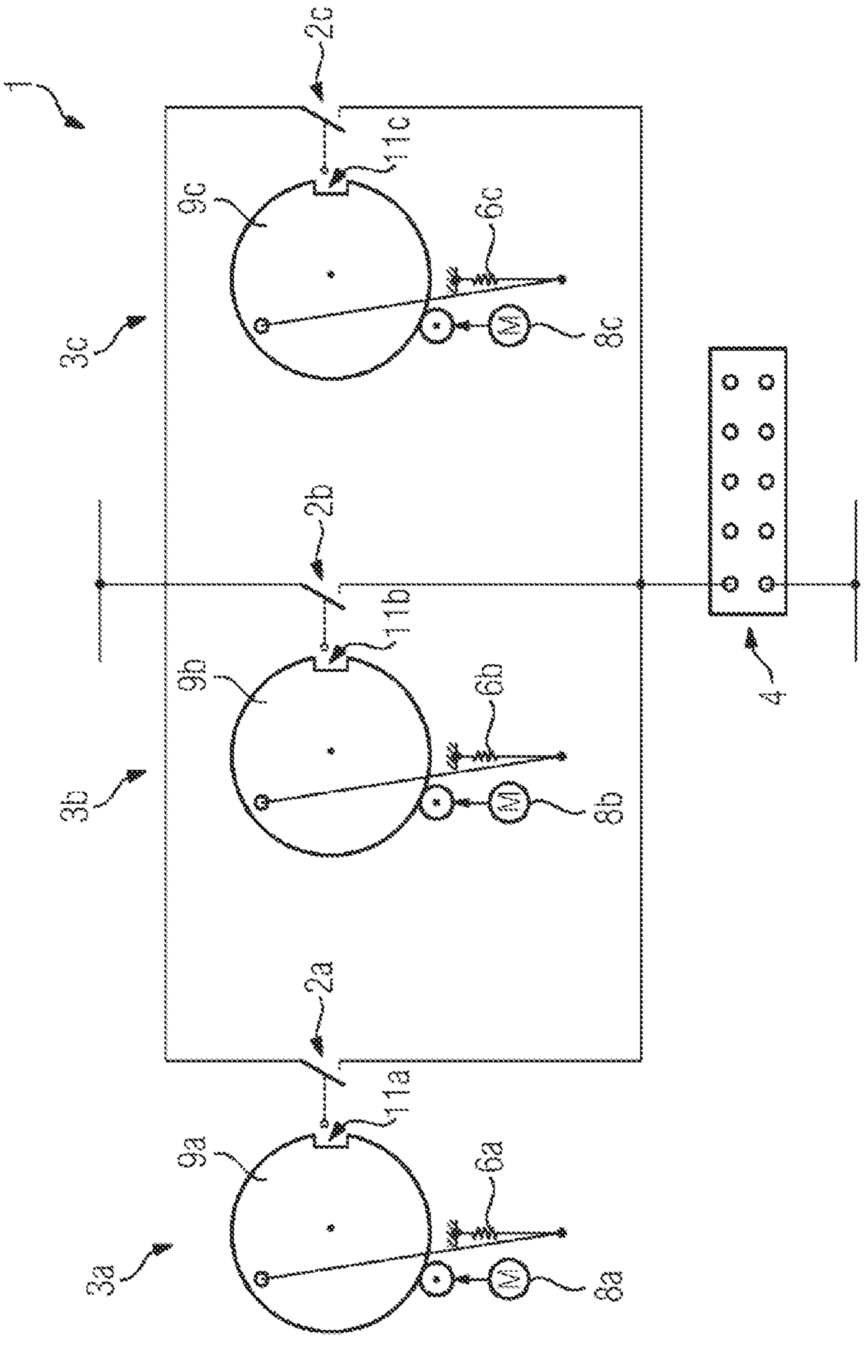

The three switches 2*a*, 2*b*, 2*c* are for example designed as motor end switch contacts or included therein. The motors 8*a*, 8*b*, 8*c* are designed to tension the spring mechanisms 6*a*, 6*b*, 6*c* via mechanical elements, in particular transmission parts and/or elements of a kinematic chain that comprise tensioning wheels 9*a*, 9*b*, 9*c*. In this case, in FIG. 5, analogously to FIG. 2, the tensioning wheels 9*a*, 9*b*, 9*c* have cams 10*a*, 10*b*, 10*c*, for example in the form of bulges on the circumference of the respective tensioning wheel 9*a*, 9*b*, 9*c*, which actuate the respective switches 2*a*, 2*b*, 2*c*, in particular upon reaching the end position of the respective motor 8*a*, 8*b*, 8*c* when the associated spring mechanism 6*a*, 6*b*, 6*c* is fully tensioned. In FIG. 6, analogously to FIG. 3, the tensioning wheels 9*a*, 9*b*, 9*c*, rather than cams 10*a*, 10*b*, 10*c*, have recesses 11*a*, 11*b*, 11*c*, for example in the form of cutouts on the circumference of the respective tensioning wheel 9*a*, 9*b*, 9*c*, which actuate the respective switches 2*a*, 2*b*, 2*c*, in particular upon reaching the end position of the respective motor 8*a*, 8*b*, 8*c* when the associated spring mechanism 6*a*, 6*b*, 6*c* is fully tensioned.

The three switches 2*a*, 2*b*, 2*c*, in particular designed as motor end switch contacts, are electrically interconnected such that the status of the three spring mechanisms 6*a*, 6*b*, 6*c* of the high-voltage circuit breaker is combined and is able to be acquired by an, in particular exactly one, for example digital input of the monitoring system 4.

In the exemplary embodiment of FIG. 5, the position of the respective spring mechanism 6*a*, 6*b*, 6*c* is indicated by a cam 10*a*, 10*b*, 10*c* on the associated tensioning wheel 9*a*, 9*b*, 9*c*. The switches 2*a*, 2*b*, 2*c*, for example in the form of motor end switch contacts, are designed as opener contacts that are connected or interconnected in a parallel circuit. In this configuration, a voltage is present at the monitoring system 4 or at the input of the monitoring system 4 only until the last of the three spring mechanisms 6*a*, 6*b*, 6*c* is tensioned and the current path is thus opened.

In the exemplary embodiment of FIG. 6, the information about a non-fully tensioned high-voltage circuit breaker that is thus not ready for switching is put through when only one of the three spring mechanisms 6*a*, 6*b*, 6*c* is not fully tensioned. The status of each individual spring mechanism 6*a*, 6*b*, 6*c* is monitored by the switches 2*a*, 2*b*, 2*c*. The switches 2*a*, 2*b*, 2*c* are embodied as a closer contact and connected in parallel with one another and thus constitute an OR combination. This parallel circuit is electrically connected to an, in particular to exactly one, for example digital input of the monitoring system 4. In the case of a non-fully tensioned spring mechanism 6*a*, 6*b*, 6*c*, the corresponding switch 2*a*, 2*b*, 2*c* is actuated by the circumference of the tensioning wheel 9*a*, 9*b*, 9*c*, and the current path is closed through the corresponding switch 2*a*, 2*b*, 2*c* or end switch. A voltage is present at the input of the monitoring system 4. The current path is opened when the spring mechanism 6*a*, 6*b*, 6*c* is tensioned, the switch 2*a*, 2*b*, 2*c* drops into the recesses on the circumference of the respective tensioning wheel 9*a*, 9*b*, 9*c* and the actuation of the switch 2*a*, 2*b*, 2*c* is thus canceled. If the current path of each switch 2*a*, 2*b*, 2*c* is interrupted, then the OR combination is interrupted and no voltage is present at the input of the monitoring system 4.

Figure 7:
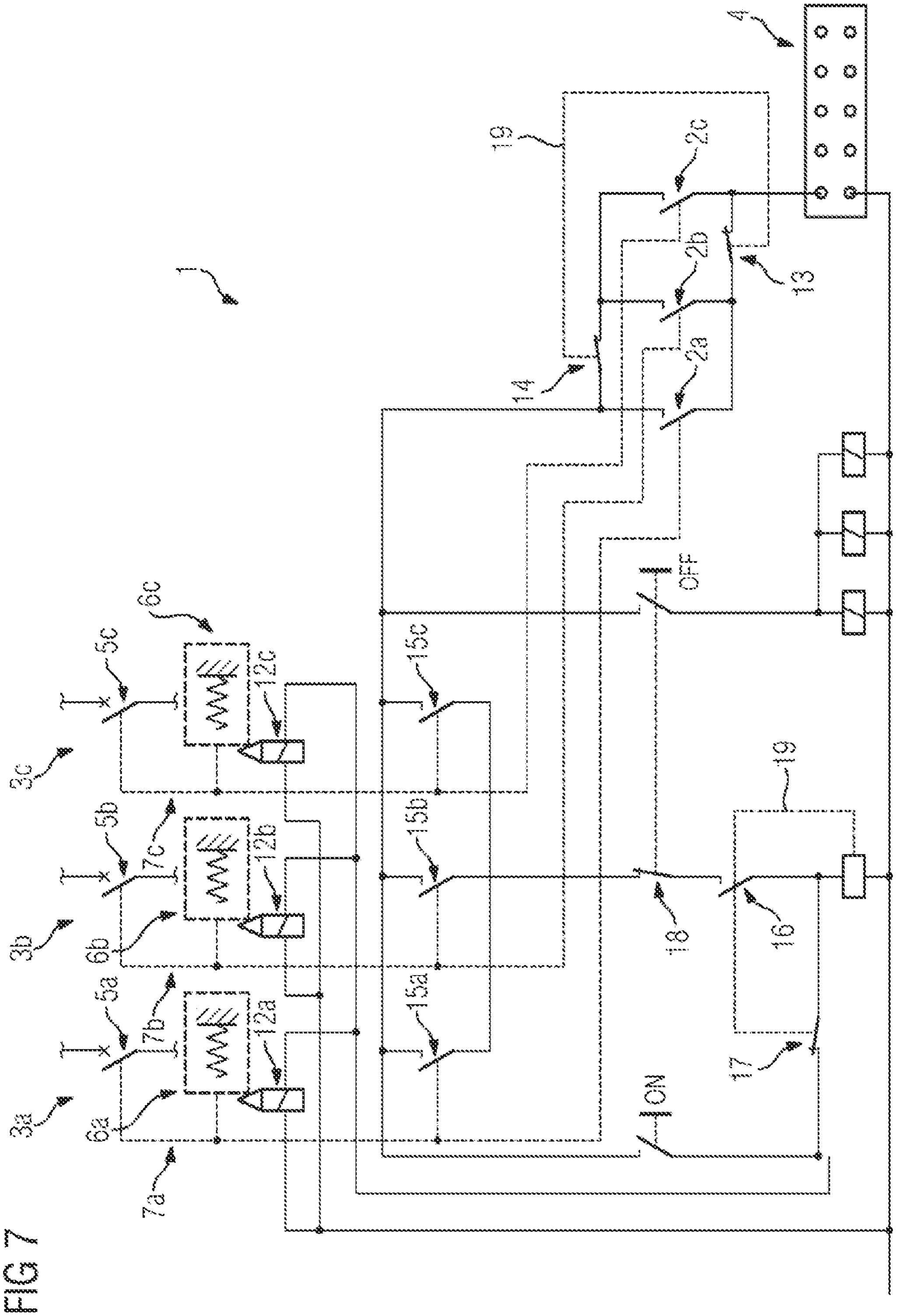

In order to make a generally applicable statement about the state of the high-voltage circuit breaker using just one input of the monitoring system 4 or to identify a fault in the desired switching operation, it is necessary to switch between a series and parallel circuit of the switches 2*a*, 2*b*, 2*c* on the basis of the current switching operation. A corresponding switching device 1 according to the invention that allows switching over between a series and parallel circuit of the switches 2*a*, 2*b*, 2*c* is illustrated in FIG. 7. To this end, a contactor and/or relay 19 is used. This contactor 19 is connected in parallel with the on triggers 12*a*, 12*b*, 12*c* of the drives. This parallel circuit may be interrupted by an opener contact 17 of the contactor 19.

A respective closer contact of the switches 2*a*, 2*b*, 2*c* of the three drives is furthermore connected in parallel. The resultant network is supplemented by opener contacts 13 and 14 of the contactor 19 such that the parallel circuit of the switches 2*a*, 2*b*, 2*c* is able to be interrupted and is thus turned into a series circuit.

A further closer contact 16 of the contactor 19 forms a series circuit with an opener contact 18 of the off actuation and with the parallel circuit of in each case one further auxiliary switch closer contact of the three phases 15*a*, 15*b*, 15*c*. This series circuit, when one of the three mentioned auxiliary switch closer contacts 15*a*, 15*b*, 15*c* and the closer contact 16 of the contactor 19 are closed, connects the contactor 19 to the supply voltage.

In the switched-off state of the high-voltage circuit breaker, all of the closing contacts of the three switches 2*a*, 2*b*, 2*c* that represent the state of the breaker units 5*a*, 5*b*, 5*c* of the high-voltage circuit breaker are normally open. In order to be able to unambiguously identify this state, the three switches 2*a*, 2*b*, 2*c* have to be connected in parallel. This parallel circuit is formed by the closed opener contacts 13 and 14 of the contactor 19. When the high-voltage circuit breaker is switched on, the on triggers 12*a*, 12*b*, 12*c* have an electric voltage applied to them and the breaker units 5*a*, 5*b*, 5*c* are closed. Since the opener contact 17 of the contactor 19 is closed, the contactor 19 is also supplied with voltage. The contactor 19 thereby draws and closes the closer contact 16, which supplies the contactor 19 with voltage through the series connection to the parallel-connected closer contacts of the auxiliary switches 15*a*, 15*b*, 15*c*, since the closer contacts of the auxiliary switches 15*a*, 15*b*, 15*c* are closed. The contactor 19 latches even when the voltage pulse for the on triggers is not present. The actuated contactor 19 furthermore opens its opener contacts 13 and 14, as a result of which the closer contacts of the switches 2*a*, 2*b*, 2*c* are connected in series. It is thereby possible to unambiguously identify that each of the three switches 2*a*, 2*b*, 2*c* that represent the state of the breaker units 5*a*, 5*b*, 5*c* of the high-voltage circuit breaker is closed.

In the subsequent off switching operation, the latching of the contactor 19 is triggered by the opener contact 18 of the off actuation or by the parallel circuit, connected in series therewith, of the closer contacts of the auxiliary switches 15*a*, 15*b*, 15*c*. The contactor 19 thereby drops. Its opener contacts 13 and 14 close and the series circuit of the closer contacts of the three switches 2*a*, 2*b*, 2*c*, which represent the state of the breaker units 5*a*, 5*b*, 5*c* of the high-voltage circuit breaker, is turned into a parallel circuit. If a breaker unit 5*a*, 5*b*, 5*c* does not switch on, the contactor 19 still draws and still latches, because at least one of the other two parallel-connected auxiliary switch contacts 15*a*, 15*b*, 15*c* is closed. The parallel circuit of the three switches 2*a*, 2*b*, 2*c*, which represent the state of the breaker units 5*a*, 5*b*, 5*c* of the high-voltage circuit breaker, is thus turned into a series circuit. This series circuit however does not carry any electric voltage to the input of the monitoring system 4 because it is opened, interrupted by the open switch 2*a*, 2*b*, 2*c* of the non-functional breaker unit 5*a*, 5*b*, 5*c*.

The monitoring system 4 thus indicates an on command, but does not identify the corresponding signal at the input. A fault is thus output.

If a breaker unit 5*a*, 5*b*, 5*c* does not switch off, the latching of the contactor 19 is still interrupted and it still drops because the opener contact 18 of the off actuation opens the current path. The series circuit of the three switches 2*a*, 2*b*, 2*c*, which represent the state of the breaker units 5*a*, 5*b*, 5*c* of the high-voltage circuit breaker, is thus turned into a parallel circuit. This parallel circuit carries the electric voltage to the input of the monitoring system 4, because it is closed by the closed switch 2*a*, 2*b*, 2*c* of the non-functional breaker unit 5*a*, 5*b*, 5*c*.

The monitoring system 4 thus indicates an off command, but does not identify the missing signal at the input. A fault is thus output.

In the case of high-voltage circuit breakers, known from the prior art, each end switch is electrically connected to in each case one input of the monitoring system. Three inputs of the monitoring system are thus occupied, and the actual signal interpretation is performed in the monitoring system.

Rather than this, the switching device 1 according to the invention, as described above, has the effect that part of the signal interpretation, specifically the combination, for example in the form of AND or OR, in particular interchangeably between AND and OR, is achieved through the wiring or interconnection of the end switches or switches 2*a*, 2*b*, 2*c*. The number of required inputs on the monitoring system is thereby reduced, and free inputs remain. The free inputs may be used for other tasks, in particular for the connection of sensors, for example temperature, pressure, moisture, current and/or voltage sensors.

In the case of monitoring systems in the form of a Sensbox, two digital inputs and three analog inputs are available. Only one input, in particular a digital input, has to be connected to the above-described switching device, as a result of which only one monitoring system for monitoring the states of the breaker units and/or the drives, in particular the spring mechanisms and/or motors, in particular tensioning motors, of the respective breaker units, is required. The in particular four free inputs of the monitoring system may be used for other tasks, thereby saving on expenditure and costs. When using a Sensbox according to the prior art, two digital inputs would be too few to monitor three end switches, and two Sensboxes or monitoring systems would be necessary, linked to higher expenditure and higher costs.

The exemplary embodiments described above may be combined with one another and/or may be combined with the prior art. For instance, for example one, two, three or more breaker units may be included in the high-voltage circuit breaker, and/or for example one, two, three or more spring mechanisms and/or drive motors, in particular for tensioning spring mechanisms, may be included, these in particular all being monitored by the switching device according to the invention in conjunction with the monitoring system. Instead of or in addition to breaker units, spring mechanisms and/or drive motors, other apparatuses may also be used, the states of which are able to be ascertained or monitored with or without the switching device according to the invention. For instance, surge arresters, disconnectors, grounders and/or vacuum tubes and contacts with a nominal and/or arcing contact piece may be used for example as apparatuses whose states are ascertained using the switching device according to the invention at an input of the monitoring system, in particular included in a high-voltage circuit breaker or a high-voltage switching device.

The apparatuses, for example spring mechanisms, motors and/or breaker units, whose states need to be ascertained using the switching device, are in particular mechanically connected to the switches via mechanical connection elements, which for example comprise elements of a kinematic chain, in order to ascertain states of the apparatuses. As an alternative or in addition, the connection may also be made electrically, electronically or through data transmission, in particular optically. The respective switch may in this case be actuated in particular electrically, electromagnetically and/or mechanically, for example following transmission and/or conversion of signals from the associated apparatus whose states need to be ascertained using the switching device.

It is also possible to use one, two or more switching devices according to the invention, for example two at two digital inputs of a monitoring system. Multiple identical or different types of apparatus, for example disconnectors and breaker units, may thereby for example be monitored independently of one another. Multiple high-voltage circuit breakers and/or other high-voltage devices, for example on a switch panel containing one or more switching devices according to the invention, may also be monitored. Additional sensors may alternatively or additionally be monitored, in particular by a monitoring system, connected to the switching device according to the invention. The switching operations of the switching devices may also be changed, for example supplemented by further switches for other tasks or, instead of using switches, components, in particular semiconductor components such as for example transistors, or integrated circuits may be used.

LIST OF REFERENCE SIGNS

1 switching device
2*a*, 2*b*, 2*c* switch for ascertaining states of an apparatus of the switching device
3*a*, 3*b*, 3*c* apparatus of the switching device
4 monitoring system
5*a*, 5*b*, 5*c* breaker unit
6*a*, 6*b*, 6*c* spring mechanism
7*a*, 7*b*, 7*c* mechanical connection element, in particular elements of a kinematic chain
8*a*, 8*b*, 8*c* motor for tensioning a spring mechanism
9*a*, 9*b*, 9*c* tensioning wheel
10*a*, 10*b*, 10*c* cam of the tensioning wheel
11*a*, 11*b*, 11*c* recess in the tensioning wheel
12*a*, 12*b*, 12*c* on trigger of the drive
13 first opener contact for series circuit of the switches
14 second opener contact for series circuit of the switches
15*a*, 15*b*, 15*c* auxiliary switch
16 closing contact of the contactor
17 third opener contact, opener contact of contactor
18 fourth opener contact, opener contact of contactor at off actuation
19 relay/contactor

The invention claimed is:

1. A switching device for a high-voltage circuit breaker, the switching device comprising:
- apparatuses of the switching device, said apparatuses including breaker units and spring mechanisms for driving said breaker units; and
- at least two switches for ascertaining states of said apparatuses of the switching device via a monitoring system, said at least two switches being motor end position switches each replicating a state of a respective one of said spring mechanisms;
- said at least two switches being connected to one another in at least one of a series circuit or a parallel circuit and being configured to be connected together to exactly one input of the monitoring system.

2. The switching device according to claim 1, wherein said at least two switches are respective auxiliary switches each replicating a state of a respective one of said apparatuses.

3. The switching device according to claim 2, wherein each of said auxiliary switches replicates a state of a respective one of said breaker units.

4. The switching device according to claim 2, wherein said apparatuses include mechanical connection elements, and said at least two switches are each configured to be actuated by a respective one of said mechanical connection elements.

5. The switching device according to claim 4, wherein said mechanical connection elements are elements of a kinematic chain.

6. The switching device according to claim 4, wherein said mechanical connection elements are connection elements of said breaker units.

7. The switching device according to claim 1, which further comprises:
- tensioning wheels each associated with a respective one of said at least two switches, said tensioning wheels having at least one of cams or recesses;
- motors each configured for tensioning said respective one of said spring mechanisms through a respective one of said tensioning wheels; and
- each of said switches configured to be tripped by at least one of said cams or said recesses.

8. The switching device according to claim 7, wherein each of said switches is configured to be tripped by at least one of one cam or one recess of said respective one of said tensioning wheels.

9. The switching device according to claim 8, wherein each of said recesses is formed in a periphery of said respective one of said tensioning wheels.

10. The switching device according to claim 7, wherein said at least two switches are exactly three switches, and each of said switches is associated with at least one of a respective one of said breaker units or a respective one of said spring mechanisms or a respective one of said motors for tensioning a respective spring mechanism.

11. The switching device according to claim 10, wherein said three switches are each one switch per respective pole of the high-voltage circuit breaker.

12. The switching device according to claim 1, which further comprises at least one of a relay or a contactor configured to switch between said series circuit and said parallel circuit of said at least two switches.

13. The switching device according to claim 12, wherein said at least one of said relay or said contactor has opener and closing contacts configured to be switched to change between said series circuit and said parallel circuit of said at least two switches.

14. A high-voltage circuit breaker, comprising:
- a switching device according to claim 1; and
- said monitoring system, said monitoring system including or being at least one of a data acquisition or data processing or data storage or data transmission unit.

15. The high-voltage circuit breaker according to claim 14, wherein said monitoring system has at least one of digital-to-analog or analog-to-digital converters.

16. The high-voltage circuit breaker according to claim 14, wherein said monitoring system includes a plurality of inputs being at least one of electrical or optical inputs, and at least one of said series circuit or said parallel circuit of said at least two switches is connected to one of said inputs.

17. The high-voltage circuit breaker according to claim 14, wherein said monitoring system has inputs, and sensors for monitoring a state of the high-voltage circuit breaker are connected to said inputs of said monitoring system.

18. The high-voltage circuit breaker according to claim 17, wherein said sensors are configured for measuring at least one of temperature, moisture, pressure, current or voltage, resistance or radiation.

19. A high-voltage circuit breaker, comprising:

a switching device according to claim 1; and said monitoring system, said monitoring system including or being at least one of a data acquisition or data processing or data storage or data transmission unit;

said monitoring system including five inputs being at least one of electrical or optical inputs;

said at least two switches being three switches; and at least one of said series circuit or said parallel circuit of said three switches being connected to one of said inputs.

20. A method for operating a switching device for a high-voltage circuit breaker, the method comprising:

providing the switching device according to claim 1;

using said at least two switches to replicate the states of said apparatuses of the switching device; and using said at least two switches, in at least one of said series circuit or said parallel circuit, to forward the states of said apparatuses through an input of a monitoring system.

21. The method according to claim 20, which further comprises forwarding the states of said apparatuses, as electrical variables or voltages, through exactly one input of the monitoring system.

22. The method according to claim 20, which further comprises combining said at least two switches as at least one of an OR combination through said parallel circuit or an AND combination through said series circuit.

23. The method according to claim 20, which further comprises providing said at least two switches as at least one of:

end position switches each replicating a state of a respective one of said spring mechanisms as a drive for a respective one of said breaker units, or switches connected in said parallel circuit as an OR combination having a voltage present at the input of the monitoring system until all of said spring mechanisms are tensioned, or switches connected in said series circuit as an AND combination having a voltage present at the input of the monitoring system until at least one of said spring mechanisms is tensioned, or switches switched between said series circuit and said parallel circuit.

24. The method according to claim 23, which further comprises using a relay to change said at least two switches between said series circuit and said parallel circuit.

25. The method according to claim 24, which further comprises using said relay to change said at least two switches between said series circuit and said parallel circuit depending on tripping of the high-voltage circuit breaker.

* * * * *